June 4, 1935.　　　J. F. CILLEY　　　2,003,678
VACUUM RELIEF VALVE
Filed Oct. 30, 1931　　　2 Sheets-Sheet 1
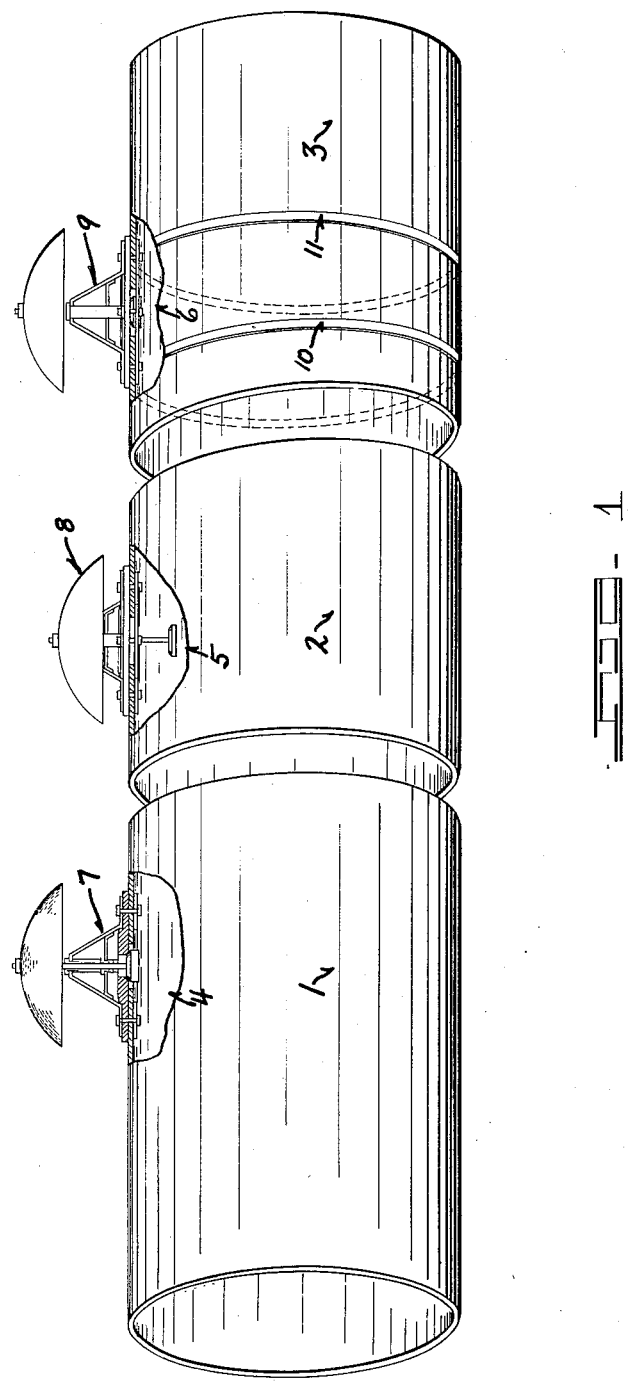
INVENTOR-
JARED F. CILLEY
BY
Darby & Darby
HIS ATTORNEYS.

June 4, 1935.  J. F. CILLEY  2,003,678
VACUUM RELIEF VALVE
Filed Oct. 30, 1931  2 Sheets-Sheet 2
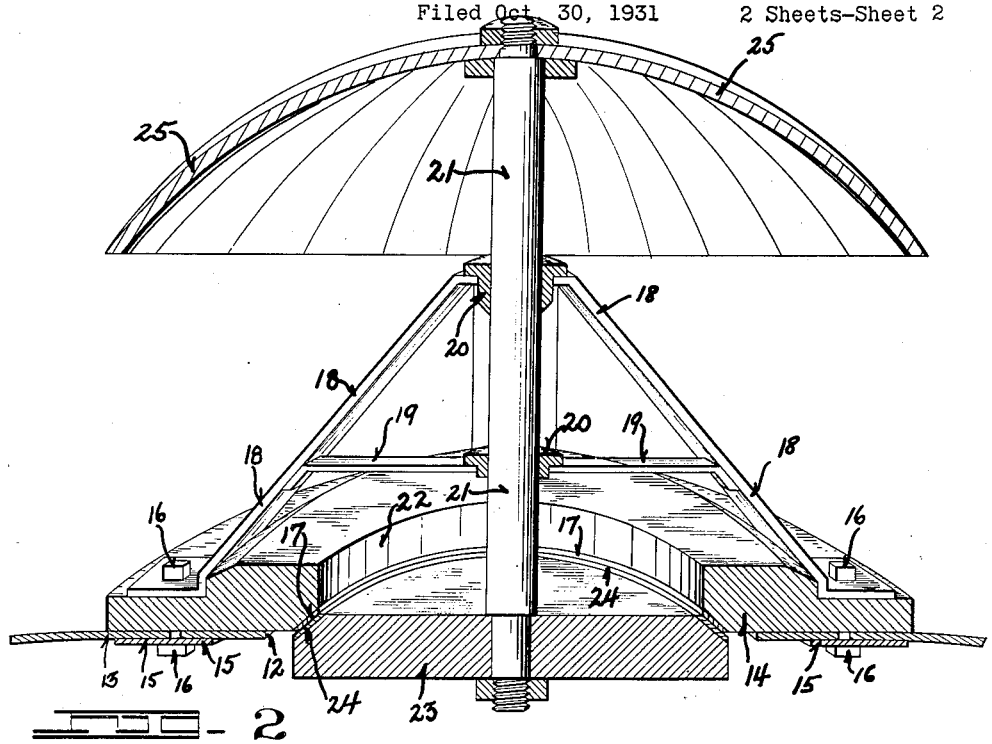
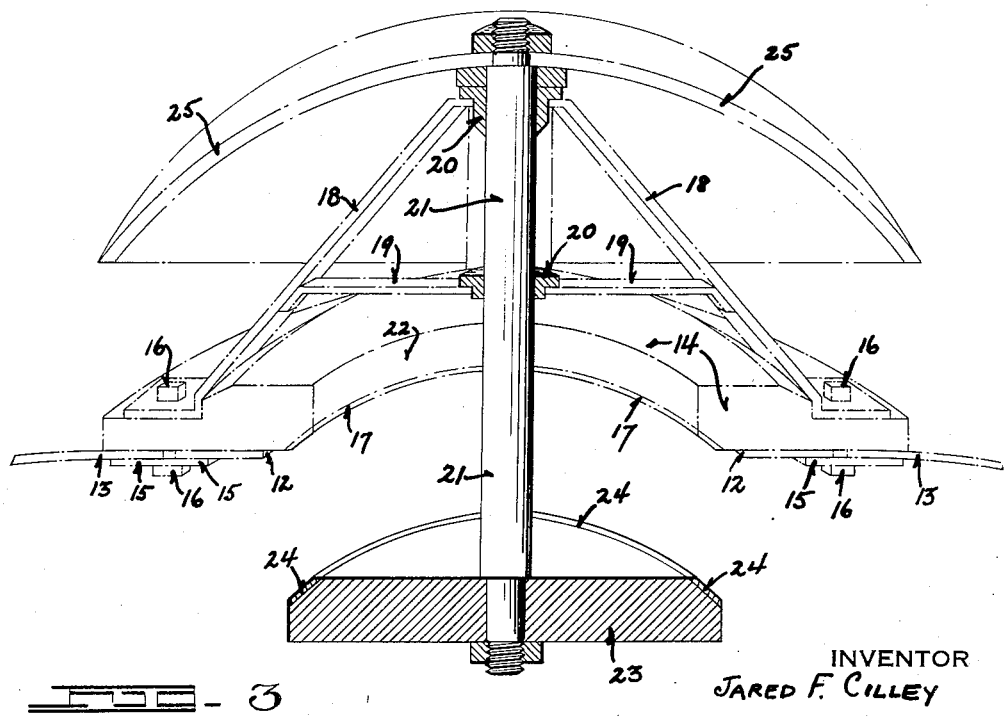
INVENTOR
JARED F. CILLEY
BY HIS ATTORNEYS
Darby & Darby Patented June 4, 1935

2,003,678

UNITED STATES PATENT OFFICE 2,003,678

VACUUM RELIEF VALVE

Jared F. Cilley, Wadhams, N. Y.

Application October 30, 1931, Serial No. 572,051

1 Claim. (Cl. 137—69)

This invention relates in its broadest aspect to improvements in vacuum relief valves.

One of the objects of this invention is the creation of a novel valve structure for relieving a vacuum.

Another object of this invention is the creation of a novel valve structure for relieving any vacuum that may arise within a fluid pipe due to cessation of fluid flow therethrough.

Another object of this invention is the creation of a novel relief valve adapted to relieve (by admitting air) the vacuum created in a penstock or water pipe when the flow through such conduit ceases, under abnormal conditions, because of breaks, large leaks or stoppage at the intake.

A still further object of this invention is the creation of a novel vacuum relief valve which is simple in construction, employs no floats or pockets, is quick and accurate in operation and, because of the absence therefrom of anything freezable in nature, can be used in any climate and under any conditions.

Various other objects than those just set out will appear more fully hereinafter.

In the hydro-electric industry where the generation of electric power depends to a very large extent upon the proper transmission of water from a dam or the like through a penstock or enlarged pipe to a water wheel or turbine, it is obviously necessary that to insure continual, smooth, and uninterrupted operation of the prime movers the flow of water through such penstock must be at a constant velocity, as well as uninterrupted. If the flow is either interrupted or of varying velocity, the prime mover operates at varying speeds and the generation of power is uneven, thereby necessitating the employment of numerous different expedients to overcome the effect of such unevenness before the electric power is made available for commercial utilization. It has been obviously desirable, therefore, to create some device which would inherently tend to smooth out and insure a continuity of water flow.

As is well known, the usual conduit used for transmitting the water from a dam to a prime mover is an enlarged pipe known as a penstock and which is made of wood or metal, as the case may be. These pipes, being of very large diameter, in the case of an inadvertent or abnormal creation of a vacuum therewithin, are subject to collapse. Such a condition often has been found to occur when the water flowing through such a pipe is drained off by a break, a large leakage, or even a stoppage at the intake, due to clogging or the like. Such a collapse, while not usually occurring at the point along the pipe where the water is being drained off, results very often in the destruction of a considerable length of the pipe some distance upstream. In one instance it has been found that as much as 500 ft. of pipe had to be replaced about one-half mile upstream from the point where a break occurred.

It is the purpose of this invention, therefore, to create a novel vacuum relief valve adapted to permit of the intake of air to relieve any vacuum that may arise within a penstock, thereby insuring not only continuity of flow but safety and longevity of the penstock in use.

By the novel valve construction which I hereinafter disclose, it will be seen that it is possible to make the flow of water through the pipe regular and continuous and also prevent any possible pipe collapse because of accidental pipe breaks or the like.

In the accompanying drawings—

Figure 1 is a perspective view of a number of pipe or penstock sections with parts broken away to exhibit my novel relief valve in open and closed positions and the manner of securement thereof on the penstock;

Fig. 2 is a perspective sectional view of my novel relief valve shown in closed position; and Fig. 3 is a perspective view, partly in dot-dash lines, showing my novel relief valve in open position.

Similar reference characters refer to similar parts throughout the several views of the drawings.

Referring specifically now to Fig. 1, it will be noted that I there show three pipe or penstock sections 1, 2 and 3, respectively, broken away at 4, 5 and 6 to show the mounting on each of said sections of one of my novel relief valves 7, 8 and 9. As illustrated, it will be noted that relief valves 7 and 9 are in closed position, while relief valve 8 is shown in open position. On pipe section 3 there is shown two hoops 10 and 11 which may be used in connection with a wooden penstock or the like to effect securement of the relief valve to the penstock. The hoops which I have shown are peculiarly adaptable to aid in the securement of my novel relief valve to a wooden penstock or the like. In the case, however, of metal penstocks or pipes, securement can usually be effected by bolting, welding or the like, and the employment of hoops may easily be dispensed with. I have, however, illustratively shown the hoops extending around pipe section 3 to show a mode of use.

Referring now to Fig. 2 for a complete illustration of my novel relief valve proper, it will be noted that a hole 12 of proper size to conform to the size of valve to be used is first cut in the pipe or penstock and then a series of bolt holes are drilled in the pipe 13. Atop the pipe there is mounted a cast steel saddle 14 which is conformed to the curvature of the pipe. Within the pipe and adjacent the hole a steel ring 15 is secured by bolts 16 passing through the bolt holes 13. By employing a steel ring of this character there is effected not only a strengthening of the installation, but also an effective seal which minimizes all possibility of leakage. Secured to the internally beveled face of the cast steel saddle 14 is a ring 17 preferably of non-corrodible material machined to form a valve seat. On the saddle 14, along the rim of the outer surface thereof, and also bolted thereto by the bolts 16 are the metal angle members 18 having cooperating horizontal strut members 19 for supporting the sleeve bearings 20, in which a valve stem 21, preferably of anti-rust material, is adapted to work. The steel saddle 14, as will be observed, has centrally disposed therein an opening 22 somewhat smaller in diameter than the orifice 12 cut in the pipe. Into and through said orifice 22 the valve stem 21 projects into the interior of the penstock. Within the penstock and secured to pipe stem 21, by bolting or the like, is the valve member 23 formed of cast steel or the like. Mounted along the rim of this valve member 23 is a beveled non-corrodible ring 24 adapted to cooperate with the ring 17 to effect a firm valve seating. At the other end of the valve stem 21 there is secured thereto by bolting or the like a steel umbrella canopy 25 of sufficient area to obtain the full effect of any water that may spout up through the opening 22. As shown, the valve member 23 having thereon the non-corrodible ring 24, together with the valve stem 21 and canopy 25, are adapted to move together as a single unit.

It is contemplated that a number of valves of the character just described shall be mounted along the length of a pipe of considerable length, said valves preferably being uniformly spaced apart by any prechosen distance.

Having now described the construction of my novel valve, I will explain the operation thereof. As the purpose of my valve is to break any vacuum which may come into being thereby preventing possibility of pipe collapse, and also to allow air to readily escape when the pipe line is being filled, thereby avoiding strain thereon, the operation thereof is such that the valve will open when a vacuum of sufficient magnitude obtains. On the other hand, while water is coursing through the pipe a closed condition of the valve prevails.

Starting, therefore, from the original condition which exists upon installation when no water is flowing through the pipe, it will be noted that the valve will be open due to the weight of the large metal valve member 23 and accompanying structure. When the water is turned on by degrees and fills the pipe line from the bottom up, the air that is naturally in the pipe is displaced by the water, and the air at the outlet end of the line rushes back up the pipe and closes the first valve up from the outlet end by escaping through the opening 22 thereof. This is due to the fact that usually the entire head of water is not turned on at one time to completely fill the pipe in one on-rush, but rather the pipe line is filled up by degrees from the bottom up. Together with the air that is expelled from the first valve up from the outlet end there is, of course, a certain amount of water. A part of the air and water is expelled through the opening 22 and rises and impinges upon the under surface of the umbrella-like member 25, thereby closing the valve in question. The valve may obviously be closed by the pressure of either the water or the air acting against the under surface of the canopy member 25 in cooperation with the pressure of the water under the bottom surface of the valve member 23.

Presuming that the first valve up from the outlet end is closed in the manner just explained, it follows that when the air which is returned up the pipe, as it is filled up with water below, comes to the next valve up along the line, will close this valve in turn, until ultimately all of the valves along the length of the pipe stand closed.

While water is flowing it is quite obvious that the valve will be held closed solely by pressure of the water and no springs, floats or other complications are employed to maintain such condition. Should a break occur at some point in the pipe or the intake become stopped or a large leak prevail, it is obvious that a vacuum will soon be created within the pipe and the water pressure having fallen off the valve will open of its own weight assisted by the vacuum in the pipe and the air pressure on the outer surface of the valve member 23. As a practical matter, however, it has been found that in operation with my novel relief valve properly designed, it will usually open before the pressure of the escaping water is entirely gone and thereby allow free passage for such air as may be carried along by the water, thereby preventing any untowards effects on the pipe.

From the foregoing description it will be apparent that the present invention utilizes such effective force as may be obtained from the volume of air which is forced back upstream when the water fills up the penstock below, for such purposes as effecting in conjunction with the pressure of the water a secure closing of the valve.

It will be further noted here that the escaping air is the major agent in effecting a closing of the valve, while the water pressure is the major agent in maintaining the valve closed. However, during the closing operation, some of the water escapes and aids the air in the closing operation.

I have found that preferably the contact points, or rings, the bushings and the valve stem should be of a material that will not rust or stick, such as bronze, and that the general dimensions and mechanical detail should be such as to provide sufficient strength for different operating heads of water or pressure.

While, therefore, I have described my invention in connection with certain materials and the foregoing illustrative description, I do not intend to be limited thereby, but inasmuch as many changes may be made in the above construction and many apparently widely and different embodiments of the scope of the invention may be made without departing from the spirit and scope thereof, it is intended that all matter hereinabove contained or shown in the accompanying drawings shall be interpreted as illustrative and not in any way limiting. The following claim is intended to cover all of the generic and specific features of the invention described.

What I desire to secure by United States Letters Patent is:

A vacuum relief valve adapted to relieve vacuum within a penstock having an orifice which is controlled by said valve, an external saddle member riding on said penstock over the orifice, a valve seat on the inner side of said saddle member, a valve member for engaging said valve seat, a valve stem for carrying said valve member, a plurality of strut members, bearings carried by said strut members for guiding said valve stem, a reinforcing ring and means for securing said ring and the saddle member to the penstock on opposite sides thereof and the strut members to the saddle member, and an umbrella-like member secured to the free end of said valve stem, said member having its concave surface facing the penstock.

JARED F. CILLEY.